United States Patent [19]
DeFrees

[11] 3,910,551
[45] Oct. 7, 1975

[54] INTERNAL EMERGENCY VALVE FOR STORAGE TANK

[76] Inventor: Joseph H. DeFrees, 414 Liberty St., Warren, Pa. 16365

[22] Filed: Nov. 14, 1974

[21] Appl. No.: 523,586

[52] U.S. Cl. .............................. 251/144; 251/63.6
[51] Int. Cl.² ...................................... F16K 31/122
[58] Field of Search ...................... 251/144, 63.6, 63

[56] References Cited
UNITED STATES PATENTS

| | | | |
|---|---|---|---|
| 2,019,786 | 11/1935 | Jurs | 251/63.6 |
| 3,065,949 | 11/1962 | De Frees | 251/144 X |
| 3,392,956 | 7/1968 | De Frees | 251/144 |

*Primary Examiner*—Arnold Rosenthal
*Attorney, Agent, or Firm*—Baldwin, Egan, Walling & Fetzer

[57] ABSTRACT

A remote controlled internal emergency valve for the outlet of a fluid transportation storage tank, operable by pressurized fluid, and including a spring biased plunger selectively engageable with a valve seat of an outlet port, to control the flow of fluid product from the tank. The valve is economical to produce and is easy to assemble, and includes a stationary piston partially defining an actuating pressure chamber which is coupled to a source of the pressurized actuating fluid, for actuating the reciprocal plunger off the valve seat. An exhaust chamber is provided in an inner cylinder of the valve structure for positively insuring that the actuating fluid for operating the valve can not contaminate the product content of the tank. The valve is so constructed and arranged that it is readily cleanable so that after a particular type of fluid product is carried in the tank, the valve can be expeditiously cleaned for use of the tank for another product.

15 Claims, 3 Drawing Figures

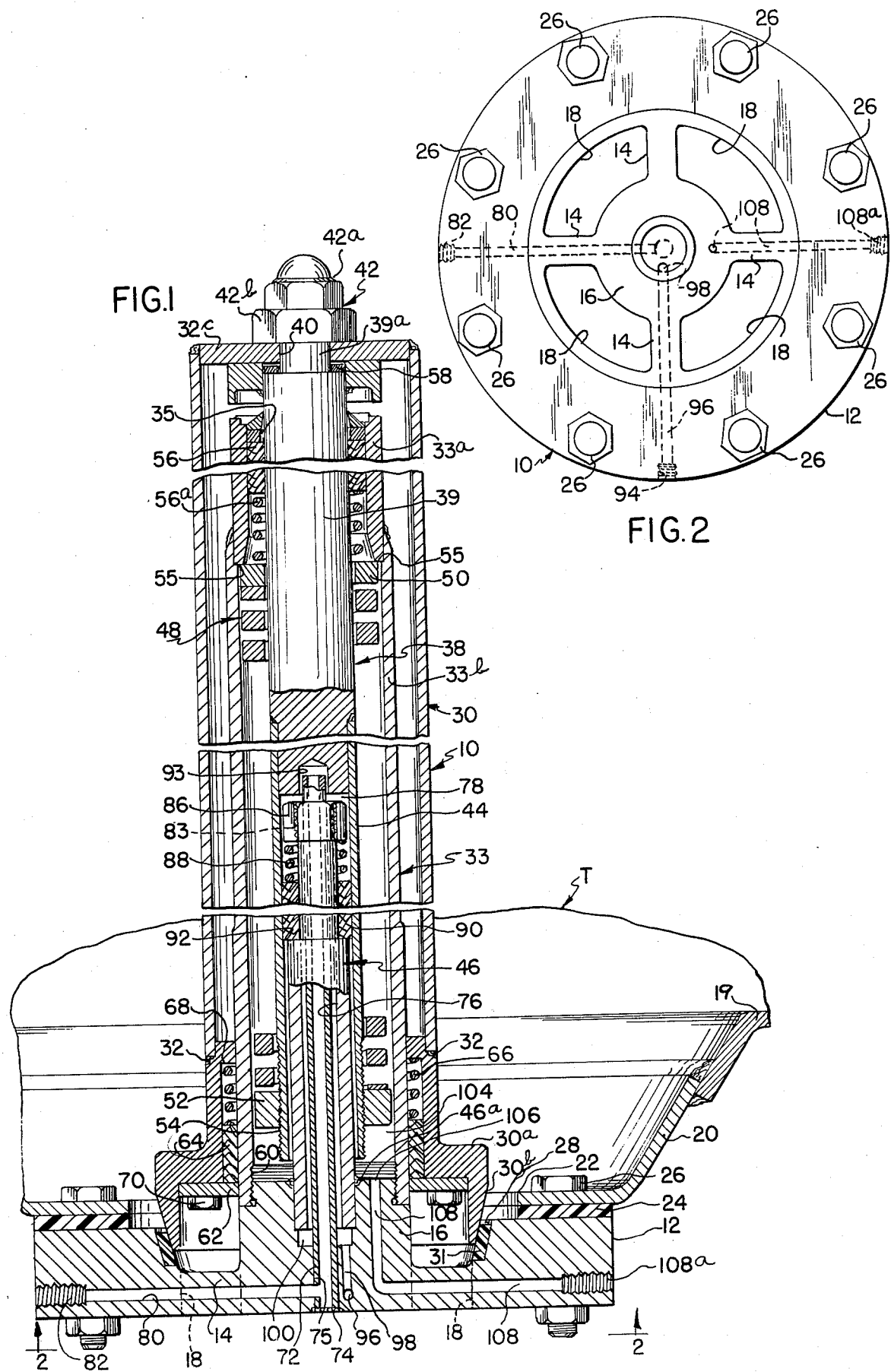

INTERNAL EMERGENCY VALVE FOR STORAGE TANK

This invention relates in general to valve mechanism for controlling fluid flow from an enclosure, such as for instance, a tank truck or trailer used for transportation of various types of liquids (e.g., gasoline, chemicals, oils) and more particularly, relates to a remote control emergency valve which can be expeditiously produced and assembled, and which operates to effectively control the flow of fluid from the storage tank, and which is so constructed and arranged that it can be readily cleaned for convenient use of the storage tank with different types of product.

BACKGROUND OF THE INVENTION

Various types of emergency valves including internal valves, are known in the prior art. One of these is illustrated in applicant's U.S. Pat. No. 3,392,956 issued July 16, 1968 in the name of Joseph H. DeFrees and entitled "Valve." Such prior art valves present certain problems with respect to the manufacture of the component parts thereof, and the assembly thereof, and have not been entirely satisfactory. Emergency valves are required by the United States Department of Transportation on various types of transportation storage tanks, such as for instance, tank trucks and trailer tanks, and generally speaking, an internal type control valve is more favored over the external type valve due to freedom from damage. In case of accident, if the valve is external of the tank, it may be knocked off from the tank or damaged, and thus fail in its basic purpose of keeping the product in the tank.

SUMMARY OF THE INVENTION

The present invention provides an internal type remote control, emergency valve for a vessel or tank adapted to contain a fluid product, and wherein the valve is relatively economical to produce and assemble and will operate effectively to control the flow of fluid product from the tank, and wherein a novel structural arrangement of the valve is provided.

Accordingly, an object of the invention is to provide a novel internal type remote control emergency valve for the outlet of a fluid storage tank.

Another object of the invention is to provide an emergency valve of the above-mentioned type which is so constructed and arranged that it is readily cleanable so that after a particular type of fluid is carried in the tank, the valve can be expeditiously cleaned for convenient use of the tank with a different type of fluid product, and without contamination of the latter.

A still further object of the invention is to provide an internal emergency valve of the aforementioned type which includes means for positively insuring that the hydraulic actuating fluid for remotely operating the valve, can not contaminate the product contents of the tank.

A still further object of the invention is to provide an internal, remote control emergency valve of the above-discussed type which includes a base having a fluid port therein with a hollow plunger reciprocal to and from the port, for selectively sealing the same whereby the plunger can control the fluid flow through the tank discharge opening, and with the valve including a base cylinder extending upwardly from the base interiorly of the plunger and having an opening in the top thereof, with a piston cylinder connected to the plunger and extending through the opening in the base cylinder in relatively reciprocable relation thereto, with resilient means coacting with the piston cylinder and urging the piston cylinder and connected plunger downwardly into closed sealing relation with the base port, and with a centrally located piston projecting upwardly into the piston cylinder secured to the base, with the piston defining in part a pressure cavity between the piston and the piston cylinder, for receiving pressurized hydraulic fluid for actuating the piston cylinder and attached plunger upwardly against the resistance of the resilient means, for opening the valve.

Other objects and advantages of the invention will be apparent from the following description taken in conjunction with the accompanying drawings wherein:

BRIEF DESCRIPTION OF THE DRAWINGS

FIG. 1 is a sectional, elevational view of a valve embodying the invention, and showing the valve in closed condition;

FIG. 2 is a bottom plan view taken generally along the plane of line 2—2 of FIG. 1 looking in the direction of the arrows;

DESCRIPTION OF PREFERRED EMBODIMENT

Figure 3:
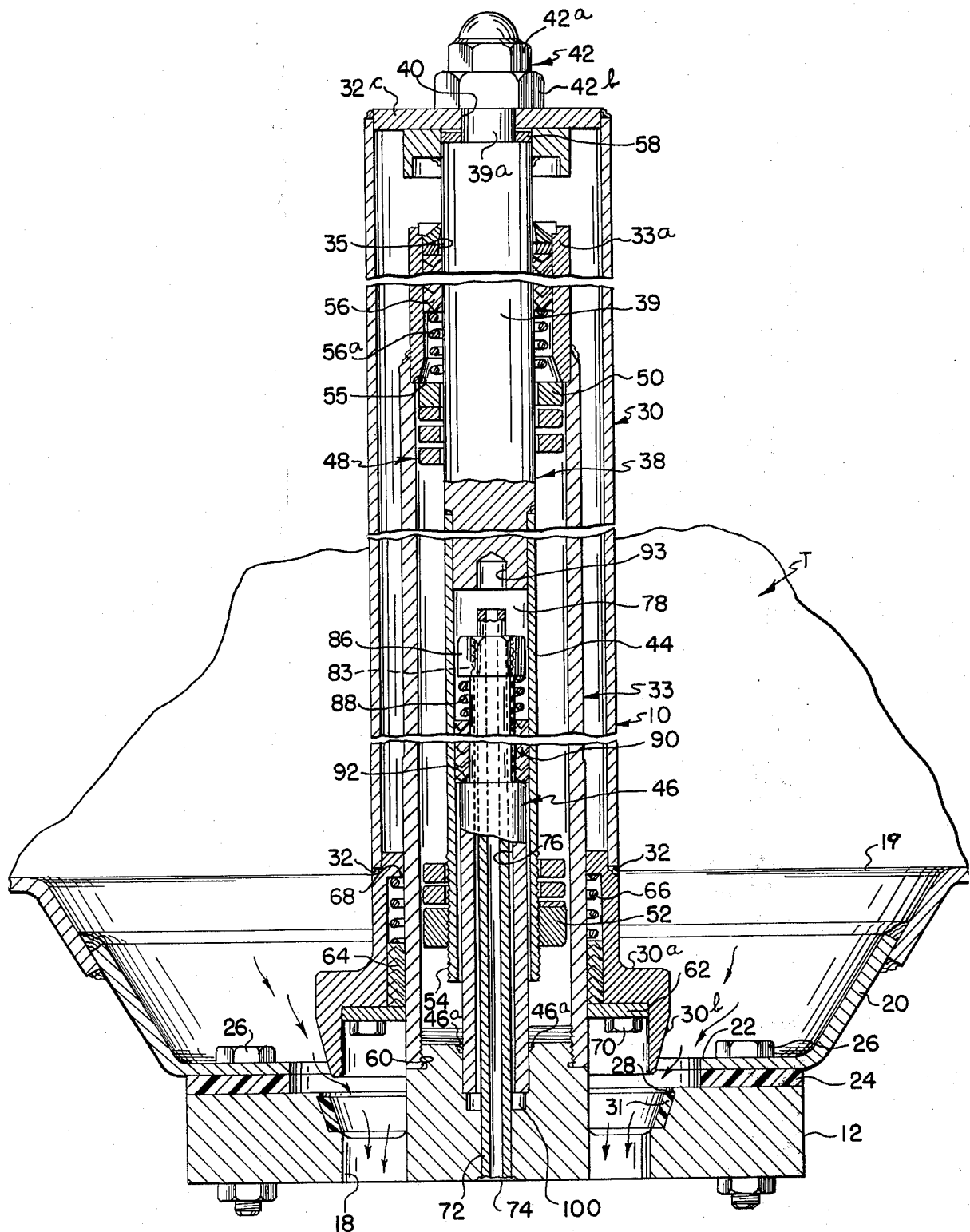
FIG. 3 is a view generally similar to FIG. 1, but showing the valve having been actuated to "open" condition permitting gravity flow of fluid out of the associated tank.

Referring to the drawings, there is shown a valve 10 embodying the invention and including a base portion 12 in the form of an annular ring having inwardly extending radial webs 14 which support at their juncture a centrally disposed, upstanding core portion 16 between the webs 14. The central portion 16 in conjunction with webs 14 define openings 18 which comprise the valve port through which is adapted to flow the fluid product in the associated tank T (FIG. 1).

The tank includes a bottom wall 19 having a drain section 20 formed thereon. Drain 20 defines a drain opening 22 adapted to be disposed in generally vertical alignment with the aforementioned port 18 in the valve 10, when the valve is secured in operative position internally of the tank, and as shown for instance in FIG. 1. A sealing gasket 24 may be disposed between in the base 12 of the valve and the underside of drain 20, for sealing the connection between the valve and the drain. Any suitable means such as for instance threaded fasteners 26 may be utilized to attach the valve to the drain 20. Gasket 24 can also coact in sealing relation with the fasteners 26 for sealing the connection between the valve and the drain opening in the tank.

Base 12 includes annular valve seat 28 with which is adapted to coact reciprocal plunger 30 extending generally vertical into the tank. Seat 28 may include a ring 31 of plastic, such as "Teflon" for facilitating a sealing relation between plunger 30 and the valve seat. Plunger 30 may include skirt portion 30a which has an obliquely oriented annular surface 30b adapted for sealing coaction with the periphery of valve seat 28, for sealing relationship therewith, to seal the opening 22 in the drain 20, when the plunger is in its lowermost closed condition, as shown for instance in FIG. 1. In the embodiment illustrated, plunger 30 is of fabricated construction, comprising the aforementioned skirt portion 30a and an upstanding cylindrical upper portion connected as by means of welds 32 to the skirt portion and having a top wall 32c at its upper end.

Projecting upwardly from the central section 16 of the base and secured thereto is a base cylinder 33 disposed interiorly of plunger 30. The base cylinder 33 may be of fabricated construction and in the embodiment illustrated includes an upper end portion 33a which has a smaller internal diameter as compared to the lower portion 33b, for a purpose to be hereinafter set forth. The upper end of base cylinder 33 has an opening 35 therethrough and through which extends a piston cylinder 38. Piston cylinder 38, in the embodiment illustrated, includes an upper shank section 39 having a neck portion 39a extending through an opening 40 in the top wall 32c of the plunger member 30, and which coacts preferably in threaded relation with nut assembly 42, for securing the piston cylinder 38 to the plunger 30 for reciprocal movement as a unit. Nut assembly preferably comprises a pair of threaded, coacting nuts 42a and 42b. The lower cylindrical skirt section 44 of the piston cylinder 38 encompasses a centrally mounted piston member 46, which is attached as by means of welds 46a to the central core section 16 of base 12.

A main compression spring 48 coacts between an abutment washer 50 and an adjustable nut 52, which is threaded to the exterior of the lower skirt portion 44 of piston cylinder 38, portion 44 being exteriorly threaded as at 54 (FIG. 1). Aforementioned abutment washer 50 engages shoulder 55 provided by the upper section 33a of base cylinder 33, and thus provides a positive stop for the main spring 48.

Sealing or packing means 56 coacts between the smooth cylindrical exterior of upper shank section 39 of the piston cylinder 38 and the interior of the upper portion 33a of the base cylinder, and seals the space therebetween during reciprocal movement of the piston cylinder and associated plunger with respect to the piston 46 during actuation of the valve. The sealing means 56 may include a coil spring 56a encircling the piston cylinder and supported on the aforementioned abutment washer 50. Since the resistance to compression of spring 56a is smaller than the resistance to compression of the main spring 48, the position of the abutment washer 50 is maintained after assembly thereof between springs 48,56a irrespective of the reciprocal movement of the piston cylinder and associated plunger with respect to the base cylinder 33. Sealing means 56 insures that fluid will not seep into or from the space between the piston cylnder and the base cylinder at the upper portion of the latter, during operation of the valve. Moreover, a sealing gasket 58 (FIG. 1) is preferably provided at the neck portion 39a of piston cylinder 38 to prevent flow of fluid product from the tank past the neck portion 39a and into the space between the plunger and the base cylinder 33.

In the embodiment illustrated, the base cylinder 33 is threaded as at 60 at its lower end, and when in assembled condition on base 12 of the valve is threaded onto the complementary threaded central section 16 of the base, so that it is readily attachable to and detachable from the base. A retainer plate 62 maintains sealing means 64 between the interior of the plunger and the exterior of the base cylinder. A spring 66 coacting between shoulder 68 and the sealing packing 64 maintains a predetermined force on the packing. Retainer plate 62 can be held in position by any suitable means such as for instance threaded fasteners 70.

A standpipe 72 is provided secured to the base as at sealing weld 74 and extends up through a passageway 75 in the base and an axially aligned passageway 76 in the stationary piston 46, and terminates at its upper end at a pressure cavity 78 in piston cylinder 38. Standpipe 72 is connected by means of a passageway 80 which in the embodiment illustrated extends through one of the webs 14 defining the port 18. The exteriorly accessible entry end to passageway 80 may be threaded as at 82 and is adapted for receipt of a threaded plug member as will be hereinafter described in greater detail.

The upper end of the piston member 46 may be threaded as at 83 and provided with a nut 86 which coacts with a compression spring 88 to urge the sealing packing 90, disposed in the space between the exterior of the piston and the interior of the cylindrical portion 44 of the piston cylinder 38 into sealing relation. It will be seen that the piston embodies a shoulder 92 thereon which abuts the lower end of the packing 90, providing an abutment for the adjustable force of spring 88.

The aforementioned standpipe 72 projects upwardly through and above the nut 86 through the aforementioned passageway 76 and into a antichamber portion 93 of pressure cavity 78. Fluid pressure may be supplied to the pressure chamber 78 by means of threaded port 94 (FIG. 2) in the base 12, which communicates the passageway 96 passing through one of the webs 14 to vertical passageway portion 98 (FIG. 1) which communicates with a chamber 100 (FIG. 1) which in turn communicates with aformentioned passageway 76 through the piston 46. Port 94 can be coupled by means of a flexible line to a hydraulic pump (not shown) for supplying hydraulic actuating fluid to passageways 96 and 98, to the chamber 100, and then through the passageway 78 spacing to pressure chamber 78, thus causing upward actuation of the piston cylinder 38 and attached plunger 30, and thus opening the valve port 18, and thus opening drain opening 22 in the tank, as shown for instance in FIG. 3.

In accordance with the invention, means are provided to positively prevent contamination of the product contents of the tank with the actuating fluid of the valve. Although the chances of the valve actuating fluid bypassing the sealing packing 90 is highly remote, in the event of any leakage of for instance hydraulic actuating fluid from chamber 78 past the packing 90, it would flow downwardly between the exterior of the piston 46 and the interior of the piston cylinder 38 into chamber 104 disposed below main spring nut 52. A drain port 106 is provided in the bottom floor of chamber 104 which connects as by means of passageway 108 to port 108a, which again may be threaded for coupling to a drain line. Port 108a is adapted to remain open and permits the escape of air and any actuating fluid that might happen to seep passed the piston packing sealing means 90. Thus, positively preventing contamination of the contents of the tank with valve actuating fluid.

Operation of the valve mechanism may be as follows: Upon application of pressurized actuating fluid to the base port 94, the actuating fluid will flow through passageway 96 up through supplemetary passageway 98 into chamber 100, thence up the clearance space between the passage 76 wall surface and the exterior of standpipe 72, and into the pressure chamber 78, thus causing the plunger 30 and attached piston cylinder 38 to move upwardly, thereby opening the port 18 of the valve mechanism, and communicating the drain opening 22 in the tank drain 20 with the open port of the valve.

Upward movement of the plunger and attached piston cylinder will cause compression of the main spring 48 due to the corresponding upward movement of nut 52 on the piston cylinder. Moreover, during such upward movement, the sealing means 56 coacting between the interior of the base cylinder and the exterior of the piston cylinder and the sealing means 64 coacting between the exterior of the base cylinder 33 and the interior of the plunger 30, and the piston packing or sealing means 90 coacting between the interior of the piston cylinder and the stationary piston, seal the valve and prevent leakage of fluid into the various areas between the component parts thereof.

When the hydraulic actuating pressure is initially applied to port 94 of the valve, the air in the pressure chamber 78 is ejected by the incoming hydraulic liquid, through the hollow center of the standpipe 72, and passes via passageway 80 out the exit port 82 until hydraulic actuating fluid from the pressure chamber 78 likewise fills the standpipe and passage 80. Thereafter, a sealing plug is adapted to be inserted into port 82 to close the port after all of the air has been scavaged from the valve. Since the aforementioned port 108a is maintained open, air may be drawn into the chamber 104 during upward movement of the plunger and associated piston cylinder, and upon downward movement thereof due to the reaction of the compressed spring 48, the air is exhausted out of the chamber 104 and via passageway 108 to port 108a.

It can be seen that the valve can be readily disassembled by removing the nut means 42 to permit the removal of the plunger housing 30 which exposes the base cylinder 33 for unthreading from the base, to thus expose the piston cylinder and associated piston. Also, it will be seen that the valve has no exposed crevices therein wherein fluid product in the tank can inadvertently collect. Accordingly, the valve mechanism can be readily washed down or cleaned to permit the tank to be used for storage or transportation of different types of fluids.

In assembling the valve, the piston cylinder may be forced down over the stationary piston 46 and the base cylinder 33 threaded onto the central section 16 of the base. Thereafter the plunger 30 can be positioned down over the base cylinder with the neck 39a of the piston cylinder projecting through the opening 40 thereof and the nut 42b threaded onto the neck to force the skirt portion 30a of the plunger into tight sealing relation with the valve seat ring 31. Nut 42a can then be added to the neck 39a to lock the plunger 30 and piston cylinder 38 together as a unit for reciprocal movement.

The valve can be readily hooked to a system which will cause automatic closure thereof in the event of a rupture of any of the lines to or from the valve, and which will operate to automatically cut off the flow of actuating fluid to the valve to permit automatic closure of the valve in the event of fire or predetermined heat applied to the controls thereof.

From the foregoing discussion and accompanying drawings, it will be seen that the invention provides a novel remote control emergency valve for a vessel, such as a liquid storage or transporting tank, and which is adapted for positioning interiorly of the tank, and which is relatively economical to produce and assemble, and which is readily cleanable for use of the valve in tanks adapted to carry various types of fluids. The invention also provides an emergency valve which embodies means for positively preventing contamination of the product contents of the tank from the hydraulic actuating fluid used to actuate the valve, and wherein the valve effectively operates to control the flow of fluid product from the tank.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a remote controlled valve for a fluid storage tank adapted for positioning interiorly of the tank, comprising, a base having a fluid port therein, a hollow elongated housing plunger reciprocal to and from said port, said plunger being engageable with the periphery of said port to seal the port, said base being adapted for connection to a fluid discharge opening of an associated fluid storage tank whereby said plunger can control fluid flow through the tank discharge opening, said valve being adapted for disposal substantially vertically and including a base cylinder extending outwardly from the base interiorly of said plunger, and being secured to said base, said base cylinder having an opening in the distal end thereof, a piston cylinder connected to said plunger and extending through said opening in said base cylinder in relative reciprocable relation thereto, means coacting with said piston cylinder for urging said piston cylinder and connected plunger toward said port whereby said plunger is urged into closed sealing relation with said port, a piston projecting from said base into said piston cylinder and coupled to said base, sealing means coacting between said piston and said piston cylinder, said piston defining in part a pressure cavity between said piston and said piston cylinder, and means for admitting actuating fluid to said pressure cavity to cause forced outward movement of said piston cylinder and attached plunger against the resistance of the first mentioned means, for opening said valve.

2. A valve in accordance with claim 1 including sealing means coacting between the exterior of said piston cylinder and the interior of said base cylinder and between the exterior of said base cylinder and the interior of said plunger, for sealing purposes.

3. A valve in accordance with claim 1 wherein said base cylinder is detachably connected to said base for convenient assembly and disassembly therefrom.

4. A valve in accordance with claim 1 wherein said means for admitting actuating fluid to said pressure cavity includes a standpipe extending through said piston into communication with said pressure cavity, and means communicating said standpipe to the exterior of said valve for initialy exhausting air from said pressure cavity via said standpipe.

5. A valve in accordance with claim 1 including means for positively preventing contamination of the product contents of the associated tank by the hydraulic actuating fluid used to actuate the valve from a remote location in the event of leakage by said sealing means.

6. A valve in accordance with claim 3 wherein said base cylinder is threaded at one end thereof for readily detachable connection to a complementary threaded portion of said base.

7. A valve in accordance with claim 4 wherein the said standpipe is secured to said base and extends up through a vertical passageway in said piston providing spacing between the exterior of said standpipe and the interior of the last mentioned passageway, and said standpipe projecting axially beyond said piston.

8. A valve in accordance with claim 4 wherein the first mentioned sealing means includes sealing rings disposed between said piston cylinder and said piston, and compressive applying means including a nut threaded on said piston and spring means coacting between said nut and said sealing rings, said piston having a shoulder thereon providing an abutment for said sealing rings.

9. A valve in accordance with claim 4 wherein said base cylinder comprises a cylindrical-like portion of a smaller internal diameter as compared to the internal diameter of the remainder of said base cylinder, and defining shoulder means providing an abutment for the first mentioned means.

10. A valve in accordance with claim 4 including means coacting with the first mentioned means for adjusting the resistance to compression of the first mentioned means, and wherein said first mentioned means comprises a spring.

11. A valve in accordance with claim 1 wherein said base cylinder extends upwardly from said base and has said opening in the top thereof, sealing means coacting between the exterior of said piston cylinder and the interior of said base cylinder at said top, for sealing the relative reciprocable movement of said piston cylinder with respect to said base cylinder during opening and closing movements of said plunger, the first mentioned means comprising a compression spring coacting between a shoulder on said base cylinder and an adjustable abutment on said piston cylinder and urging said piston cylinder and attached plunger downwardly toward said port.

12. A valve in accordance with claim 11 wherein said piston cylinder comprises an upper shank portion and a lower skirt portion depending from said shank portion and secured thereto, said skirt portion in conjunction with the underside of said shank portion defining in part said pressure chamber, and the exterior of said skirt portion being provided with threads thereon adapted for threaded coaction with a nut for adjusting the resistance to compression of said compression spring, said nut comprising said adjustable abutment.

13. A valve in accordance with claim 1 in combination with a storage tank having a discharge opening in the bottom wall thereof, said valve being mounted on said tank and extending through said discharge opening, with said base portion and said discharge opening being disposed in general vertical alignment, said base port being disposed below said discharge opening, with means sealing said base with respect to the underside of said tank, and means securing said base to said tank, whereby opening and closing of said port by means of said plunger correspondingly opens and closes said discharge opening in said tank.

14. A valve in accordance with claim 13 including means in said base accessible from the exterior thereof comprising said means for admitting actuating fluid to said pressure cavity, said base also including means for exhausting air from said pressure cavity upon initial application of pressurized actuating fluid to said valve.

15. A valve in accordance with claim 13 including means comprising a chamber coupled via passageway means in said base to the exterior of the latter for positively preventing contamination of the product contents of said tank in the event of inadvertent seepage of valve actuating fluid past the first mentioned sealing means, during opening actuation of said valve from a remote location.

* * * * *